(12) United States Patent
Kim

(10) Patent No.: US 7,043,260 B2
(45) Date of Patent: May 9, 2006

(54) METHOD FOR CONTROLLING PAGING ALERT TONE OF A MOBILE STATION IN A MOBILE COMMUNICATION SYSTEM

(75) Inventor: Kyou-Woong Kim, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 373 days.

(21) Appl. No.: 09/735,745

(22) Filed: Dec. 13, 2000

(65) Prior Publication Data

US 2001/0005681 A1    Jun. 28, 2001

(30) Foreign Application Priority Data

Dec. 13, 1999    (KR) ................... 1999-57082

(51) Int. Cl.
*H04Q 7/20* (2006.01)

(52) U.S. Cl. ............... 455/458; 455/561; 455/567; 455/456.4

(58) Field of Classification Search ............. 455/458, 455/426, 515, 561, 567, 404.1, 456.1–456.6
See application file for complete search history.

(56) References Cited

U.S. PATENT DOCUMENTS

| | | | | | |
|---|---|---|---|---|---|
| 5,930,718 | A | * | 7/1999 | Rydbeck | 455/458 |
| 5,966,655 | A | * | 10/1999 | Hardouin | 455/418 |
| 5,966,662 | A | * | 10/1999 | Murto | 455/458 |
| 6,011,973 | A | * | 1/2000 | Valentine et al. | 455/456.6 |
| 6,181,933 | B1 | * | 1/2001 | Jeong | 455/432.1 |
| 6,360,101 | B1 | * | 3/2002 | Irvin | 455/456.6 |
| 6,408,187 | B1 | * | 6/2002 | Merriam | 455/458 |
| 6,438,385 | B1 | * | 8/2002 | Heinonen | 455/501 |
| 6,832,093 | B1 | * | 12/2004 | Ranta | 455/456.4 |

* cited by examiner

*Primary Examiner*—William Trost
*Assistant Examiner*—Brandon J. Miller
(74) *Attorney, Agent, or Firm*—Dilworth & Barrese, LLP (57) ABSTRACT

Disclosed is a method for controlling a paging alert level of a mobile station in a mobile communication system. A base station sets information of a type and a level of a paging alert tone of the mobile station in a broadcasting channel (BCH) message and transmits the BCH message to every mobile station within a cell of the base station. The mobile station then generates a paging alert tone according to the information of the type and the level of the paging alert tone, included in the received BCH message.

16 Claims, 6 Drawing Sheets

METHOD FOR CONTROLLING PAGING ALERT TONE OF A MOBILE STATION IN A MOBILE COMMUNICATION SYSTEM

PRIORITY

This application claims priority to an application entitled "Method for Controlling Paging Alert Tone of a Mobile Station in a Mobile Communication System" filed in the Korean Industrial Property Office on Dec. 13, 1999 and assigned Ser. No. 99-57082, the contents of which are hereby incorporated by reference.

BACKGROUND OF THE INVENTION

1. Field of the Invention

The present invention relates generally to a method for controlling a paging alert tone of a mobile station in a mobile communication system, and in particular, to a method for controlling a level of a paging alert tone of a mobile station located in a specific cell or location by using a broadcasting channel (BCH) in a CDMA (Code Division Multiple Access) mobile communication system.

2. Description of the Related Art

A conventional CDMA mobile communication system primarily provides a voice service. However, a future CDMA mobile communication system will support the IMT-2000 standard which can provide a data service as well as the voice service. The IMT-2000 standard can provide a high-quality audio service, a moving picture service, and an Internet search service.

With the popularization of the mobile station (or mobile telephone), one may hear the noisy paging alert tone or ringing virtually anywhere. In public places such as a theater and a conference room, the paging alert tone of the mobile station often disturbs those around the user. It is courteous to decrease a level of the paging alert tone of the mobile station or set an operating mode (or alert type) of the mobile station to a vibration mode or a mute mode in the public places. Conventionally, however, the user must manually manipulate the mobile station to decrease the level of the paging alert tone or set the operating mode to the vibration mode or the mute mode, which is time consuming and sometimes forgotten.

The conventional mobile communication system determines, upon detecting paging of a mobile station, where the mobile station is presently located by using an ID (or telephone number) of the corresponding mobile station. Core netwok provides this information (Mobile's ID and located position) to a radio network controller (RNC) which manages a corresponding cell. A base station then transmits a paging message to the corresponding cell, under the control of the RNC.

Figure 1:
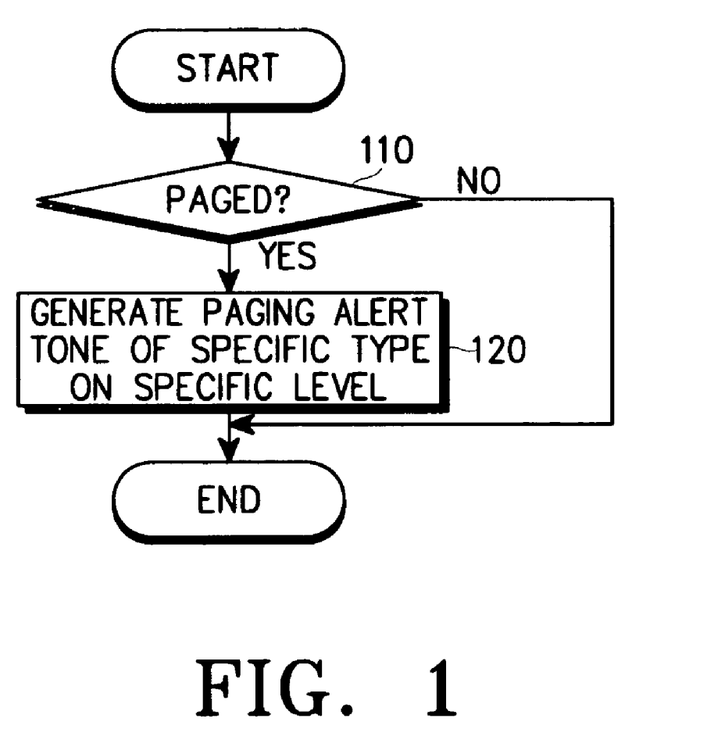
FIG. 1 is a flow chart illustrating a procedure for generating a paging alert tone of a mobile station in a conventional mobile communication system.

FIG. 1 shows a method for generating a paging alert tone of the mobile station in a conventional mobile communication system. Referring to FIG. 1, the mobile station periodically examines a corresponding paging group of a paging indicator channel (PICH). If the mobile station detects a paging occasion, in step 110, the mobile station determines whether its own ID exists in the paging message of paging channel (PCH). If its own ID exits in the paging message, the mobile station generates in step 120 a paging alert tone in a specific type (or mode) on a specific level, the type and level of the paging alert tone being previously determined by the user. That is, upon detecting a paging message including its own ID while examining the paging message assigned to it, the mobile station performs a page match procedure, and generates a paging alert tone or takes a corresponding action in order to inform the user of the incoming page or call. Here, the mobile station can be set by the user to either the mute mode, such as the vibration mode, or the normal alarm mode in which the paging alert tone is generated to inform the user of existence of paging. When the conventional mobile station is set to the alarm mode, it generates a paging alert tone of a specific type and at a specific level, the type and level of the paging alert tone being previously determined by the user. The user can preset the type and level of the paging alert tone. If paging occurs, the mobile station generates the paging alert tone in the preset type on the preset level for the user.

The problem with the current state of mobile station paging alerts is that any time the user wants to change the tone and level of an alert because of the quieter surroundings he enters into, the user must manually reset the tone and level settings of the mobile station.

SUMMARY OF THE INVENTION

It is, therefore, an object of the present invention to provide a method for restricting a paging alert level of a mobile station in a mobile communication system.

It is another object of the present invention to provide a method wherein a base station controls a paging alert level of a mobile station located in its cell area, in a mobile communication system.

To achieve the above and other objects, there is provided a method for controlling a paging alert level of a mobile station in a mobile communication system. A base station sets information on a type and a level of a paging alert tone of the mobile station in a broadcasting channel (BCH) message and transmits the BCH message to every mobile station within a cell of the base station. The mobile station then generates a paging alert tone according to the information on the type and the level of the paging alert tone, included in the received BCH message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The invention will be described with reference to a W-CDMA/UMTS (Universal Mobile Telecommunication System) system, which is a third generation mobile communication system. However, it would be obvious to those skilled in the art that the invention can also be applied to other mobile communication systems as well as the W-CDMA/UMTS system.

Figure 2:
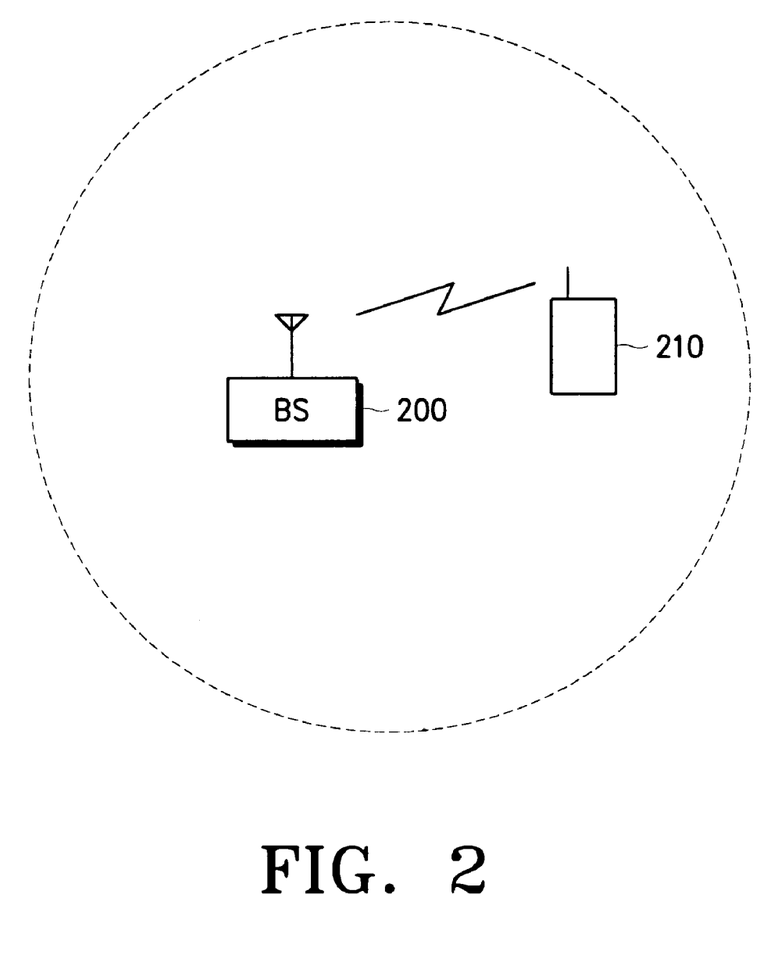
FIG. 2 is a diagram illustrating a mobile communication system to which the present invention is applicable.

FIG. 2 shows a mobile communication system to which the present invention is applied. Specifically, FIG. 2 shows a base station (BS) 200 and a mobile station (MS) 210 located within a cell radius 220 of the base station 200. Referring to FIG. 2, the base station 200 reads paging alert class (i.e., the type and level of the paging alert tone) information from a memory such as a PROM (Programable Read Only Memory) and RAM (Random Access Memory) according to the particular cell in which a BCH message is intended to be sent. The base station then writes the paging alert class information in the BCH message under its own discretion or under the control of the RNC. The base station 200 periodically transmits the set BCH message to every mobile station within the cell.

In other words, the base station 200 according to the present invention creates in the BCH message the paging alert class information for the cell. Here, the BCH message should have a message format such that the BCH message can be transmitted to every mobile station existing in the cell of the mobile station 200. That is, the BCH message according to the present invention should necessarily include a paging alert level in a BCH information field defining different specifications supported in the cell, as shown in Table 1 below.

TABLE 1

BCH Information Field
ID of present network, location area ID, UTRAN-registered area ID, cell ID
All information to be used in measuring a candidate cell for handover and cell selection
Information about a control channel in the present cell
Information defining different specifications supported by the cell
Paging Alert Level (Class #0 to Class #N)
Protocol information An example of the paging alert class structure according to an embodiment of the present invention has various paging alert levels and types as shown in Table 2 below. The paging alert class can be determined according to the surrounding features of the cell area of the base station. For example, if the cell area of a specific base station covers a public place such as a library and a theater, the base station will have a paging alert class #0 shown in Table 2, and provide this information to a mobile station, which is entering its cell area, over the BCH.

TABLE 2

| Alert Class | Alert Level | Alert Type | Comments |
|---|---|---|---|
| Class #0 | 0 dB | Vibration | Mute |
| Class #1 | 1 dB | Alarm | Lowest Level |
| . | . | . | . |
| . | . | . | . |
| . | . | . | . |
| Class #N | N dB | Alarm | Highest Level |
| User Mode | No Change | No Change | Level Set by User |

Upon detecting the paging alert class information from the BCH message, the mobile station 210 alerts (or informs) the user that the mobile station is now in an alert level-restricted cell area. Such an alert will be issued by using a display and an alert tone generator in the mobile station 210. Further, the mobile station 210 can display a specific icon to continuously inform the user of the fact that the mobile station is now in the alert level-restricted area. In addition, when the mobile station is informed of the alert level-restricted area, the mobile station can either accept or reject it. To this end, a user interface program in the mobile station 210 must include a menu for supporting such a function.

The mobile station 210 receives the BCH message having such paging alert class information, in the following procedure. The mobile station 210 calculates a paging group by using a mobile station ID (i.e., ESN (Electronic Sequence Number), IMSI(International Mobile Station Identity) or its corresponding information, and examines only the corresponding paging group of the PICH. When the mobile station detects the paging occasion by evaluating the bits in the corresponding paging group,. the mobile station reads the paging channel to determine whether the mobile station ID exists in the paging channel. If the mobile station ID, which is stored in the mobile station's permanent memory, is detected in the paging channel, the mobile station 210 performs a paging match procedure and informs the user of this fact (i.e., detection of the mobile station ID) in the paging alert mode set by the user. When the mobile station 210 is set to a vibration mode or a corresponding mute mode by the user, the mobile station 210 informs the user of receipt of an incoming call in the paging alert mode set by the user. Otherwise, when the mobile terminal 210 is set to an alarm mode, the mobile station 210 generates a paging alert tone on a level set in the BCH message. Meanwhile, when the paging alert class information in the BCH message is set to a user mode, the mobile station 210 does not change the alert level. Thereafter, when the user answers the incoming call upon detecting receipt of the incoming call, the mobile station 201 enters a call mode. In addition, when the user moves from the alert level-restricted area to a non-alert level-restricted area, the mobile station 210 restores the paging alert level to a predetermined paging alert level and provides such information to the user.

Figure 3:
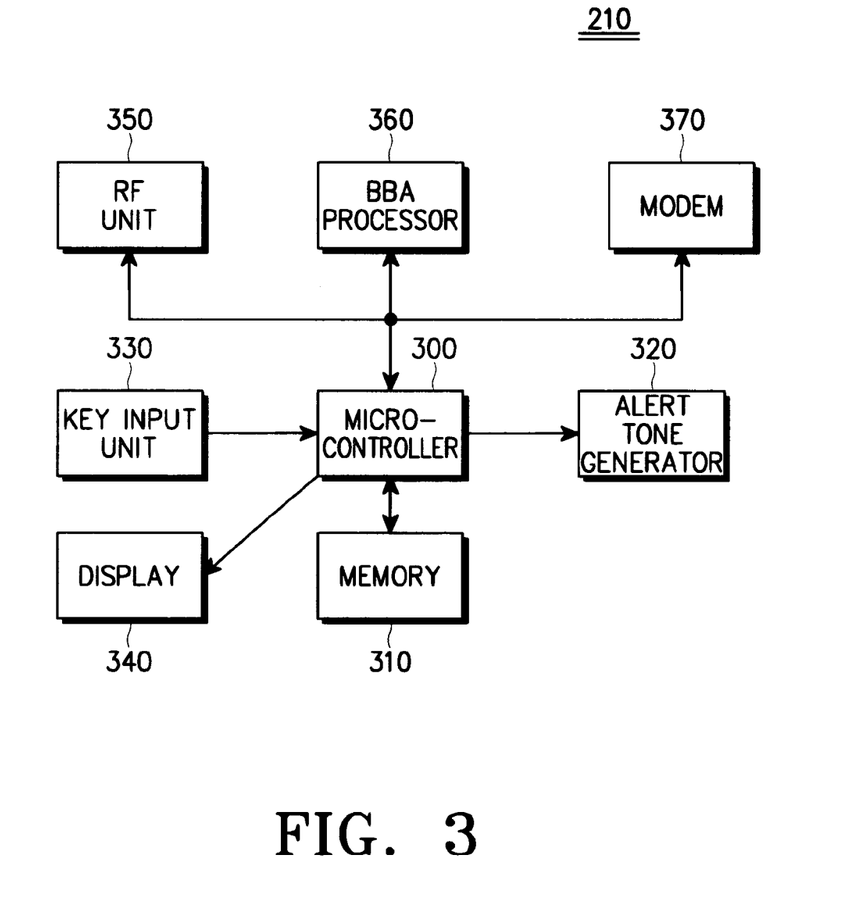
FIG. 3 is a schematic block diagram illustrating a mobile station to which the present invention is applicable.

FIG. 3 shows a block diagram of a mobile station to which the present invention is applicable. As illustrated, the mobile station 210 includes a micro-controller 300, a memory 310, an alert tone generator 320, a key input unit 330, a display 340, an RF (Radio Frequency) unit 350, a BBA (Base Band Analog) processor 360, and a modem 370. Referring to FIG. 3, the mobile station 210 according to the present invention includes a function of controlling a paging alert level. The micro-controller 300 controls the overall operation of the mobile station 210 and especially, controls a level of the paging alert tone according to an embodiment of the preset invention. In particular, the micro-controller 300 analyzes a protocol using a control program, and upon receipt of the BCH message from the base station 200, analyzes the received BCH message to extract a paging alert level field. Further, the micro-controller 300 controls the alert tone generator 320 according to a paging alert level included in the BCH message to adjust a level of the paging alert tone. The memory 310 stores the control program for performing the procedures shown in FIGS. 4 to 6, and also stores data generated during the procedures. The alert tone generator 320, under the control of the micro-controller 300, generates the paging alert tone of the set alert type at the set alert level upon receipt of an incoming call, and generates, when the user enters the alert level-restricted area, an alert tone to inform the user of this situation. The key input unit 330 includes alphanumeric keys and function keys, and particularly, includes a function key for rejecting restriction of the alert level. The function for rejecting restriction of the alert level is not limited to a single key, but may be implemented with a combination of several keys. The display 340, under the control of the micro-controller 300, outputs a status message of the mobile station 210 and displays various icons. In particular, the display 340 displays a message indicating that the user has entered the alert level-restricted area or displays an icon indicating that the alert level restriction mode is set.

Further, the mobile station 210 includes the following structure to detect the signal transmitted from the base station 200. The RF unit 350 receives an RF signal transmitted form the base station 200 under the control of the micro-controller 300. The BBA processor 360, under the control of the micro-controller 300, converts the received RF signal from the RF unit 350 into a baseband signal, and converts an analog signal to a digital signal. The modem 370 demodulates a digital signal output from the BBA processor 360 under the control of the micro-controller 300.

Figure 4:
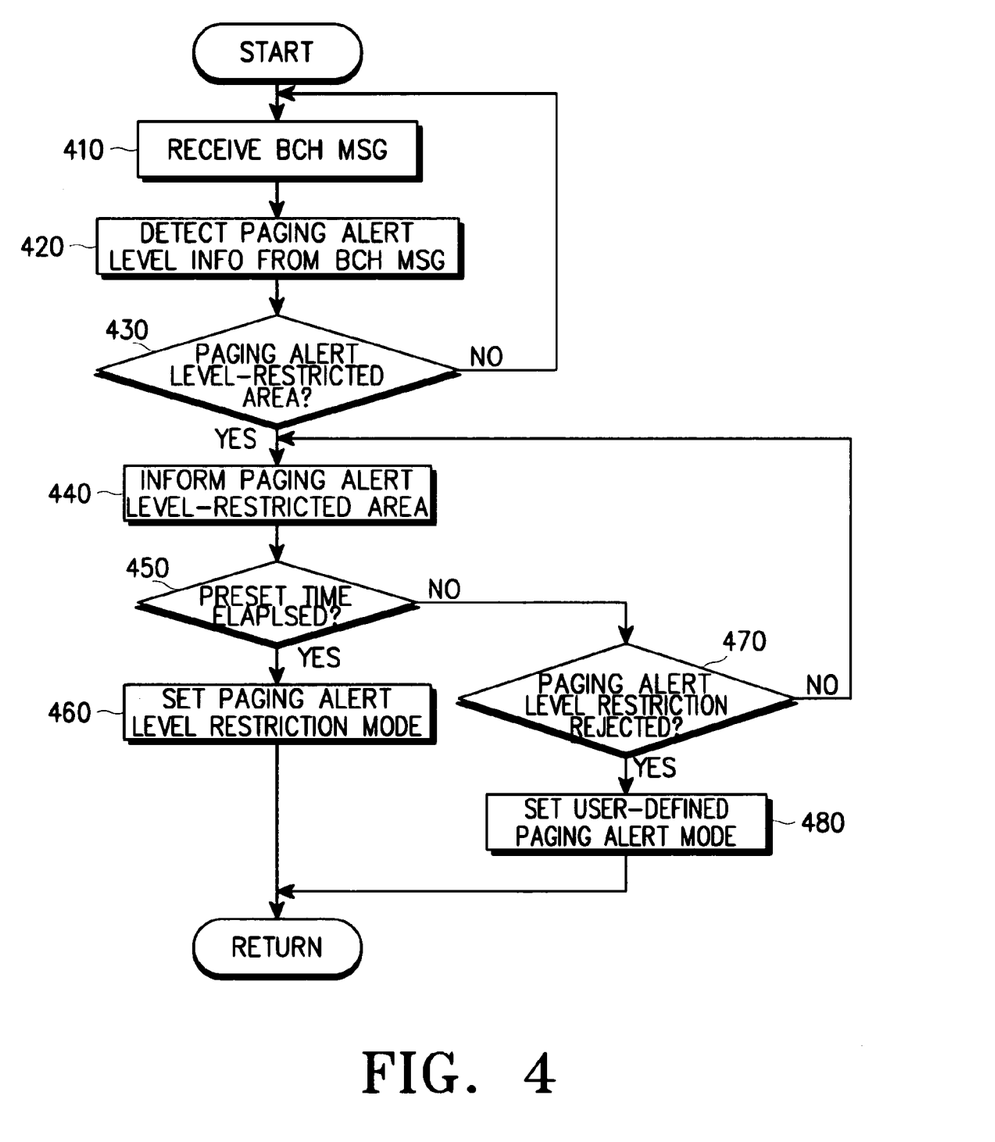
FIG. 4 is a flow chart illustrating a procedure for restricting a paging alert level of a mobile station according to an embodiment of the present invention.

FIG. 4 shows a procedure for restricting a paging alert level of the mobile station according to an embodiment of the present invention. A method for restricting the paging alert level of the mobile station according to an embodiment of the present invention will be described below with reference to FIGS. 2 to 4. The micro-controller 300 receives a BCH message through the RF unit 350 in step 410, and detects the paging alert level information from the received BCH message in step 420. Thereafter, the micro-controller 300 determines in step 430 whether the mobile station 210 is presently located in the paging alert level-restricted area, using the detected paging level information. If not, the process returns to step 410. If it is determined that the mobile station is presently located in the paging alert level-restricted area, the micro-controller 300 informs the user that he is presently located in the paging alert level-restricted cell area in step 440. To inform the user of the paging alert level-restricted area, the mobile station displays a message indicating the alert level-restricted area on the display 340 or generates an alert tone indicating the alert level-restricted area. At the sight of the alert message displayed on the display 340 or at the sound of the alert tone generated by the alert tone generator 320, the user of the mobile station 210 perceives that the mobile station is presently located in the paging alert level-restricted area, and then, accepts or rejects restriction of the paging alert level. To accept restriction of the paging alert level, the user will not set the reject function within a predetermined time at the sight of the alert message or at the sound of the alert tone. Then, the mobile station 210 will automatically generate the paging alert tone on the paging alert level set in the BCH message. However, to reject restriction of the paging alert level, the user will set the reject function within the predetermined time at the sight of the alert message or at the sound of the alert tone. The mobile station 210 then generates the paging alert tone according to the paging alert type and the paging alert level previously set by the user.

In step 450, the micro-controller 300 determines whether a time preset by an internal timer has elapsed. If the preset time has elapsed, the micro-controller 300 sets a paging alert level restriction mode in step 460. Here, the "paging alert level restriction mode" refers to restricting a level of the paging alert tone to a paging alert level designated according to the paging alert level information in the received BCH message. In addition, when the mobile station 210 enters the paging alert level restriction mode, the micro-controller 300 can also display an icon indicating the paging alert level restriction mode.

However, if it is determined in step 450 that the preset time has not elapsed, the micro-controller 300 determines in step 470 whether restriction of the paging alert level is rejected within the predetermined time. If restriction of the paging alert level is rejected within the predetermined time, the micro-controller 300 sets a user-defined paging alert mode in step 480. Here, the "user-defined paging alert mode" refers to generating a paging alert tone according to the paging alert type and the paging alert level previously set by the user, upon receipt of an incoming call.

Figure 5:
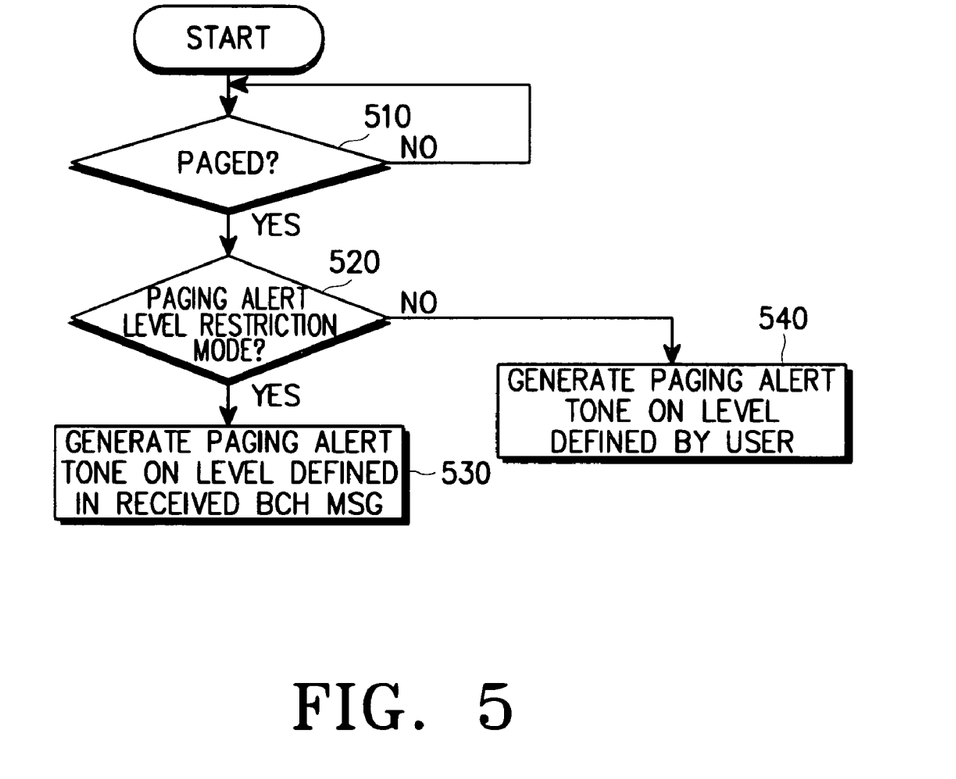
FIG. 5 is a flow chart illustrating a procedure for generating a paging alert tone of a mobile station according to an embodiment of the present invention.

FIG. 5 shows a procedure for generating a paging alert tone of the mobile station according to an embodiment of the present invention. A procedure for generating the paging alert tone according to an embodiment of the present invention will be described with reference to FIGS. 2, 3 and 5. In step 510, the micro-controller 300 determines whether the mobile station 210 is paged according to an incoming call. If the mobile station 210 is paged, the micro-controller 300 determines in step 520 whether the mobile station 210 is set to the paging alert level restriction mode. If the mobile station 210 is set to the paging alert level restriction mode, the micro-controller 300 controls the alert tone generator 320 in step 530 to generate the paging alert tone at the paging alert level designated in the received BCH message. Otherwise, if the mobile station 210 is not set to the paging alert level restriction mode, the micro-controller 300 controls the alert tone generator 320 in step 540 to generate the paging alert tone at the level designated by the user.

Figure 6:
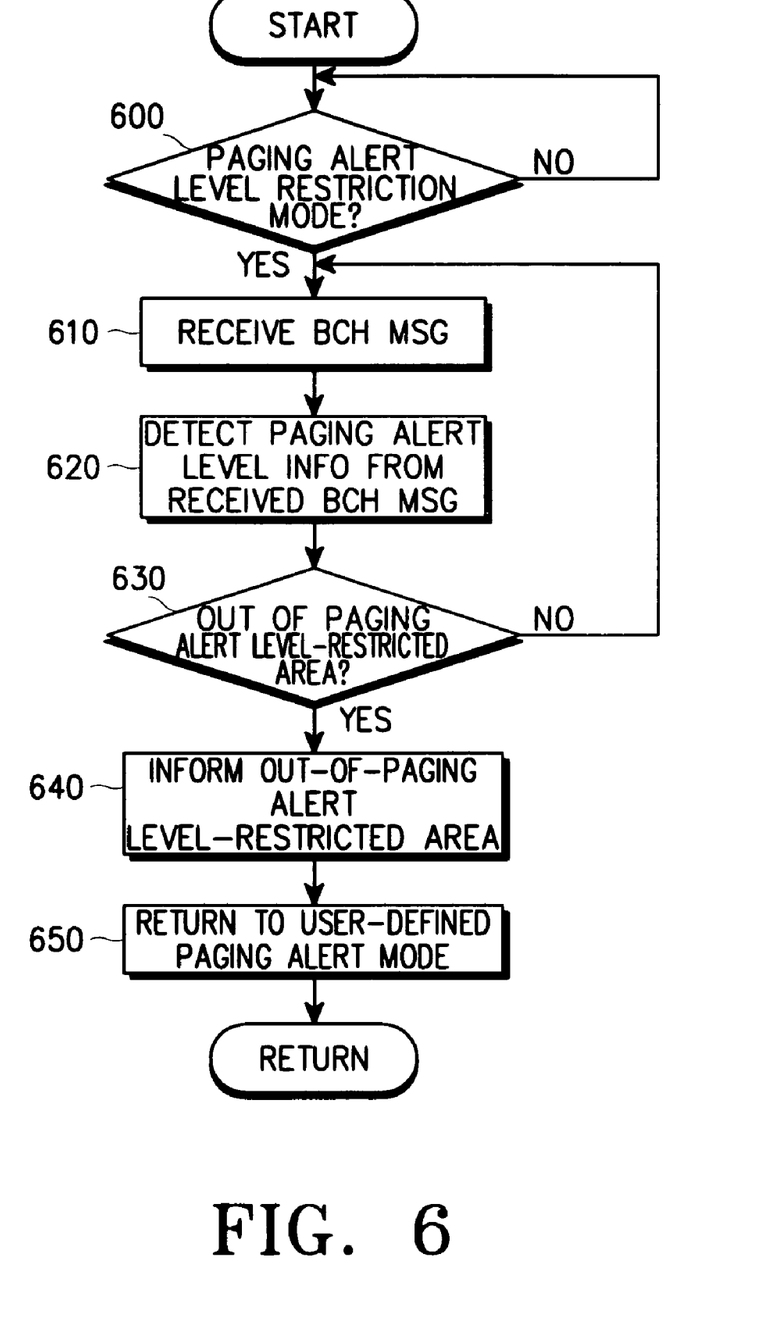
FIG. 6 is a flow chart illustrating a procedure for releasing restriction of the paging alert level of the mobile station according to an embodiment of the present invention.

FIG. 6 shows a procedure for releasing restriction of the paging alert level of the mobile station according to an embodiment of the present invention. A procedure for releasing restriction of the paging alert level of the mobile station according to an embodiment of the present invention will be described with reference to FIGS. 2, 3 and 6. In step 600, the micro-controller 300 determines whether the mobile station 210 is set to the paging alert level restriction mode. If not, the process returns to start. If the mobile station 210 is set to the paging alert level restriction mode, the micro-controller 300 receives the BCH message in step 610. Thereafter, in step 620, the micro-controller 300 detects paging alert level information from the received BCH message. The micro-controller 300 determines in step 630 whether the mobile station 210 has moved out of the paging alert level-restricted area, based on the paging alert level information in the received BCH message. If not, the process returns to step 610. If it is determined that the mobile station 210 has moved out of the paging alert level-restricted area, the micro-controller 300 informs the user in step 640 that the mobile station 210 has moved out of the paging alert level-restricted area. Here, to inform the user that he has moved out of the paging alert level-restricted area, the micro-controller 300 may display a message indicating a non-paging alert level-restricted area on the display 340 or enables the alert tone generator 302 to generate an alert tone indicating the non-paging alert level-restricted area. In step 650, the micro-controller 300 automatically returns to the user-defined paging alert mode (i.e., user mode).

As described above, the mobile station according to an embodiment of the present invention can automatically restrict a paging alert level in the public place such as a theater and a conference room, thus preventing those around the user from being disturbed by the paging alert tone. In addition, the mobile station informs the user that he is presently located in a paging alert level-restricted cell area, so that the user can accept or reject restriction of the paging alert level at the discretion of the user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling a paging alert level of a mobile station in a mobile communication system, comprising the steps of:
    setting information of a type and a level of a paging alert tone of the mobile station in a broadcasting channel (BCH) message and transmitting the BCH message from a base station to every mobile station within a cell of the base station;
    alerting the user of an entrance into a paging alert level restricted area;
    generating, in the mobile station, a paging alert tone according to the information of the type and the level of the paging alert tone, included in the BCH message; and
    alerting the user to either accept or reject the restricted mode.

2. A method for controlling a paging alert level of a mobile station in a mobile communication system having a base station which transmits a signal to every mobile station within a cell, comprising the steps of:
    receiving information of a type and a level of a paging alert tone of a mobile station from the base station through a BCH, and determining whether the mobile station is located in a paging alert level-restricted area;
    alerting the user of an entrance into a paging alert level restricted area;
    generating a paging alert tone according to the information of the type and the level of the paging alert tone, if the mobile station is located in the paging alert level-restricted area; and
    alerting the user to either accept or reject the restricted mode.

3. The method as claimed in claim 2, wherein the BCH message is generated such that the paging alert type is distinguishable according to surrounding features of the base station.

4. The method as claimed in claim 2, further comprising the step of rejecting restriction of the paging alert level designated in the BCH message within a predetermined time.

5. The method as claimed in claim 2, wherein the mobile station displays a message indicating that the mobile station is presently located in the paging alert level-restricted area.

6. The method as claimed in claim 2, wherein the mobile station generates an alert tone indicating that the mobile station is presently located in the paging alert level-restricted area.

7. The method as claimed in claim 2, wherein the mobile station displays an icon indicating that the mobile station is presently located in the paging alert level-restricted area.

8. The method as claimed in claim 2, wherein the mobile station generates a paging alert tone according to a paging alert level designated in the received BCH message, upon receipt of an incoming call.

9. The method as claimed in claim 2, wherein the mobile station automatically restores the paging alert level to a paging alert level previously set by a user, when the mobile station moves out of the paging alert level-restricted area.

10. The method as claimed in claim 9, wherein the mobile station displays a message indicating restoration of the paging alert level preset by the user.

11. The method as claimed in claim 9, wherein the mobile station generates an alert tone indicating restoration of the paging alert level preset by the user.

12. A method of controlling a paging alert tone of a mobile station being served by a base station in a mobile telecommunication system, said method comprising the steps of:
    generating a paging alert class information in a BCH message of the base station, said paging alert class information indicating an alert type and an alert level of the paging alert tone;
    transmitting the BCH message including the paging alert class information to the mobile station;
    receiving the BCH message from the base station and detecting the paging alert class information;
    alerting the user of an entrance into a paging alert level restricted area,
    setting the paging alert tone of the mobile station in accordance with the received paging alert class information; and
    alerting the user to either accept or reject the restricted mode.

13. The method of claim 12, further comprising the step of:
    determining whether the mobile station is in an alert level restricted area,
    wherein the received paging alert class information sets the paging alert tone to a restricted mode if the mobile station is in the alert level restricted area.

14. The method of claim 13, further comprising the step of:
    informing an user of the mobile station that the paging alert tone of the mobile station is set to the restricted mode.

15. The method of claim 14, further comprising the steps of:
    rejecting the restricted mode if the user rejects the restricted mode; and
    setting the paging alert tone to the restricted mode if the user does not respond within a preset time.

16. A method for controlling a paging alert level of a mobile station in a mobile communication system, comprising the steps of:
    setting information of a type and a level of a paging alert tone of the mobile station in a broadcasting channel (BCH) message and transmitting the BCH message from a base station to every mobile station within a cell of the base station;
    alerting the user of an entrance into a paging alert level restricted area according to location information included in the BCH message; and
    generating, in the mobile station, a paging alert tone according to the information of the type and the level of the paging alert tone, included in the BCH message;
    alerting the user to select or reject the restricted mode; and
    providing the user the opportunity to accept or reject the restricted mode within a given time period.

* * * * *